United States Patent [19]
Bauer

[11] Patent Number: 5,199,301
[45] Date of Patent: Apr. 6, 1993

[54] APPARATUS FOR APPLYING A KNOWN AXIAL FORCE TO A VALVE STEM

[75] Inventor: Donald L. Bauer, Atascadero, Calif.

[73] Assignee: Westinghouse Electric Corp., Pittsburgh, Pa.

[21] Appl. No.: 753,785

[22] Filed: Sep. 3, 1991

[51] Int. Cl.$^5$ .................. F16K 31/05; G01L 5/00
[52] U.S. Cl. .............................. 73/168; 73/862.31
[58] Field of Search ....................... 73/168, 862.31

[56] References Cited

U.S. PATENT DOCUMENTS

| | | |
|---|---|---|
| 3,942,368 | 3/1976 | Hoyt . |
| 3,954,005 | 5/1976 | Edwards . |
| 3,965,736 | 6/1976 | Welton et al. . |
| 4,255,967 | 3/1981 | Grymonprez et al. ............... 73/168 |
| 4,428,223 | 1/1984 | Trevisan ........................ 73/168 X |
| 4,570,903 | 2/1986 | Crass ............................ 73/862.31 |
| 4,594,900 | 6/1986 | Pellerin et al. ................... 73/806 |
| 4,607,534 | 8/1986 | Cerbone ....................... 73/862.01 |
| 4,805,451 | 2/1989 | Leon ............................ 73/168 |
| 4,911,004 | 3/1990 | Leon ............................ 73/168 |

FOREIGN PATENT DOCUMENTS 2086063A 5/1982 United Kingdom .

Primary Examiner—Daniel M. Yasich

[57] ABSTRACT

The axial force on the valve stem of a large valve can be related to the output of a strain sensor mounted on the yoke of the valve, but accuracy can be achieved only if the strain sensor is first calibrated by applying a known axial force to the valve stem. This can be done conveniently by using the invention, which includes two loading beams juxtaposed on opposite sides fo the valve stem, elongated in a direction perpendicular to the valve stem, and including a split nut or a collet for gripping the valve stem. Legs extend from the ends of the loading beam assembly parallel to the valve stem, and one or both of these legs includes a hydraulic ram for applying force to one or both ends of the loading beam assembly. This applied force can be measured independently of the yoke-mounted strain sensor.

10 Claims, 3 Drawing Sheets

APPARATUS FOR APPLYING A KNOWN AXIAL FORCE TO A VALVE STEM

BACKGROUND OF THE INVENTION

1. Field of the Invention

The present invention is in the field of mechanical testing and specifically relates to apparatus for applying a known axial force to a valve stem or to a shaft, the ends of which are not accessible.

At numerous points in a nuclear power plant, the flow of a fluid is controlled by large gate valves. When a considerable pressure difference exists between opposite sides of the gate, frictional forces become large and a large force must be exerted by the valve stem to move the gate. Under emergency conditions the pressure difference may reach very large values, and there is concern as to whether the valve will operate or can be operated safely under those conditions. In particular, there is concern about the force on the valve stem or other components.

FIG. 1 shows the type of valve on which the present invention is used. The operator (actuator) is connected to the valve by a yoke, and the valve stem is located between the two legs of the yoke. Obviously, the force in the valve stem is equal to the sum of the force in the two legs, but opposite in direction. It was well-known, even before U.S. Pat. No. 4,805,451, to install a strain sensor on one of the legs of the yoke to measure its elongation, from which the stress in the valve stem can be calculated based on knowledge of the size and material of the legs of the yoke.

With so much at stake, it would be highly desirable to provide for an independent check of the calculated force in the valve stem. This can be done by calibrating the strain sensor(s) mounted on the leg(s) of the yoke, or other sensors mounted at appropriate points on the valve. The calibration consists in applying a known force to the valve stem and noting the corresponding reading(s) of the strain sensor(s).

Once the reading of the strain sensor has been found for known amounts of force applied to the valve stem, there is a basis for believing that a particular reading of the strain sensor implies a particular amount of force on the valve stem.

2. The Prior Art

A search of the prior art revealed that little has been done in solving the narrow problem of applying a known calibrating force to a valve stem. Accordingly, the search was broadened to include analogous problems in other fields, with the following results.

In U.S. Pat. No. 4,805,451, Leon shows that the thrust on a valve stem can be derived from the readings of strain sensors mounted on the yoke of a valve. Leon states that the yoke strain sensor may be calibrated by applying a known force to the valve stem of a fully-assembled valve, but he doesn't suggest how this can be done. The Leon patent can be understood as indicating the desirability of the present invention.

In U.S. Pat. No. 4,911,004, the same Leon teaches the use of Poisson's ratio to relate the elongation or compression of the valve stem to a reduction or increase in its diameter. The valve stem is grasped by a large C-clamp that is instrumented for detecting changes in the diameter. As can be appreciated, the accuracy of this approach is limited because of the minute changes in diameter that need to be measured.

Probably the closest prior art is U.K. Patent Application No. 2,086,063A by inventor Boast. He shows an hydraulically powered (26) set of jaws 19 that clamps onto the mid-section of a vertically extending I-beam. Hydraulic rams (3, 4) exert a force along the I-beam relative to the ground. The force is derived from the hydraulic pressure at the time the I-beam is lifted off the ground.

In U.S. Pat. No. 3,965,736, Welton, et al. describes devices for measuring strain in the polish rod of a well pumping unit, but does not include means for applying a calibration thrust. In a first embodiment two blocks are connected by a tube that extends parallel to the polish rod. The blocks are attached to the polish rod by set screws. A strain gauge is attached to the tube to measure its elongation. In a second embodiment, hinged jaws are connected by an axially-extending tubular sleeve to which a strain gauge is attached. In a third embodiment, a pipe clamp with a strain gauge attached to it is used. None of these three embodiments resembles the present invention, and Welton, et al. do not include means for applying a calibration thrust.

In U.S. Pat. No. 4,607,534, Cerbone describes apparatus for determining the force with which a pin pushes against a surface. He uses a hydraulic ram to push the pin away from the surface and an electrical circuit to determine when contact between the pin and the surface is broken.

In U.S. Pat. No. 3,942,368, Hoyt shows an apparatus for testing the holding power of earth anchors by pulling upward on them. The force is derived from measurement of the hydraulic pressure. The end of the hydraulic ram is provided with a clevis and the end of the anchor bolt is provided with an eye. The clevis pin passes through the eye to fasten the ram to the anchor bolt. Unlike the present invention, the invention of Hoyt requires access to the end of the bolt or shaft and thus is not directly applicable to the present invention.

In U.S. Pat. No. 3,954,005, Edwards shows a part having an inwardly-facing frusto-conical member that surrounds a length of rebar being tested. Two or more partly annular gripping wedges fit between the frusto-conical member and the rebar.

In U.S. Pat. No. 4,594,900, Pellerin, et al. use a hydraulic vice for gripping the ends of a length of lumber for applying longitudinal compressive and tensile loads to it.

SUMMARY OF THE INVENTION

The present invention provides a dependable and easy-to-use device for applying a known force to the valve stem.

In the present invention, the valve stem is embraced on opposite sides by a longitudinally-split loading beam, and a force parallel to the direction of the axis of the valve stem is applied to one or both ends of the loading beam. In a preferred embodiment, the force is produced by a hydraulic ram, and the force is applied between an end of the loading beam and a portion of the valve body. The split loading beam may be threaded, or may grasp a threaded nut to obtain a grip on a threaded valve stem. If the valve stem is smooth, a grip can be provided by using wedges between the loading beam and the valve stem. The loads applied by the apparatus can be measured by use of a strain gauge on the underside of the loading beam or by the use of a strain button in series with the loading ram. Alternatively, the load can be calculated from the pressure applied to the hydraulic ram.

In devising the apparatus of the present invention, the present inventor had to solve three main problems. The first problem was how to get a grip on the shaft, considering that its ends are not accessible. The second problem was how to apply an axial force, and the third problem was how to measure the applied axial force.

The approach used by the present inventor to get a grip on the shaft is to use a beam that is split on a plane that contains the axis of the shaft. In accordance with the present invention, the elongated dimension of the beam is perpendicular to the axis of the shaft, and the beam is split in two lengthwise. This approach is common to the several embodiments.

In a first embodiment, applicable to a threaded shaft, the two halves of the beam are clamped together, and a hole to accommodate the shaft is drilled and tapped through the clamped halves. When this has been done, the clamps are removed allowing the halves to be separated. One half is placed on one side of the shaft, the other half is placed on the opposite side of the shaft, and the halves are clamped together again.

In a variation of this first embodiment, a split nut is made, which fits into appropriately-shaped cavities in the halves of the split beam.

The split-beam approach is also used where smooth (non-threaded) shafts are to be loaded. In this variation, the shaft is gripped between two blocks that are drawn together by bolts, the gap between the blocks being oriented perpendicular to the plane on which the beam is split.

In yet another variation, a set of wedges is located between the shaft and the split beam.

The problem of how to apply an axial force was solved by letting the end portions of the split beam extend outward on opposite sides of the shaft and between the legs of the yoke. The ends of the split beam are pivotally supported on top of legs that extend downward to the top part of the valve body. The legs are adjustable in length, and one or both legs includes a hydraulic or pneumatic load ram. If two load rams are used, provision is made to equalize their internal pressures. Alternatively, a single mechanical load jack may be inserted in one of the legs.

The problem of how to accurately measure the applied axial force was solved by using any of several techniques. It would, of course, not be proper to use the strain sensor commonly mounted on a leg of the yoke, since the whole purpose of the present invention is to provide an independently measured force for calibrating that strain sensor. In a first embodiment, a strain button is placed in series with the load ram. In another variation, the force is calculated from the pressure measured in the hydraulic or pneumatic load ram. In yet another variation, a strain gauge is mounted on the underside of the split beam to measure its elongation as the force is increased.

From the above description it will be clear that the technique described can be applied equally well to situations in which the legs from an inverted ram and split beam extend downward from the split beam to grip below the underside of the body to bonnet flange to allow valve stem loading in a tensile direction.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figure 1:
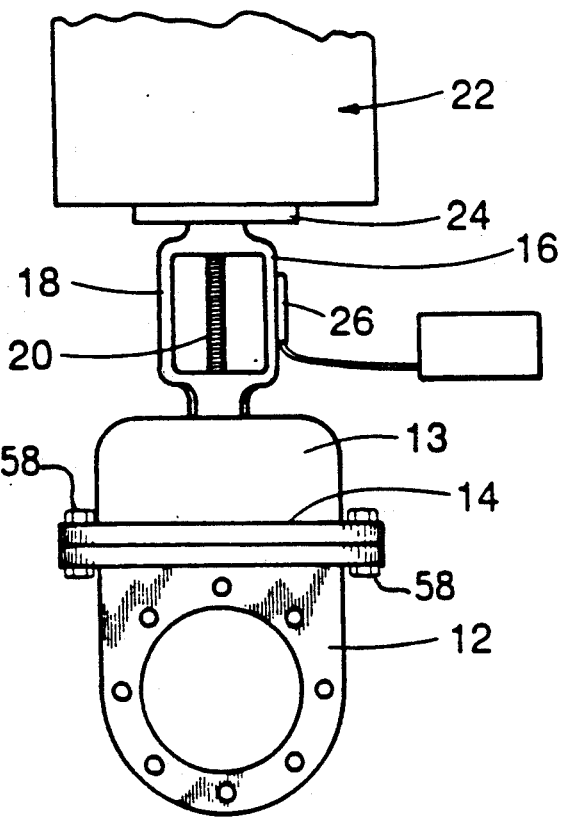
FIG. 1 is a side elevational view of a valve, known in the prior art, of the type on which the present invention is used.

FIG. 1 shows the type of valve with which the present invention was designed to operate. The valve includes a valve body 12 surmounted by a bonnet 13 from which there extends upwardly a yoke structure having legs 16 and 18. The yoke structure serves as a mounting for the valve stem 20 and also provides a point of attachment for the actuator 22 that turns the valve stem, or pushes and pulls it, to close and open the valve. Typically, an actuator plate 24 serves to adapt the actuator to the yoke structure.

It is known that a strain sensor 26 can be attached to one leg 16 of the yoke to provide a signal that is related to the thrust on the valve stem 20.

As described above, the purpose of the present invention is to provide a means of applying a known axial load to the valve stem so that the relation between the applied axial force and the signal produced by the strain sensor 26 can be made definite, thereby calibrating the strain sensor.

The device of the present invention applies a force between the valve stem 20 and the body-to-bonnet flange 14 of the valve body.

Figure 2:
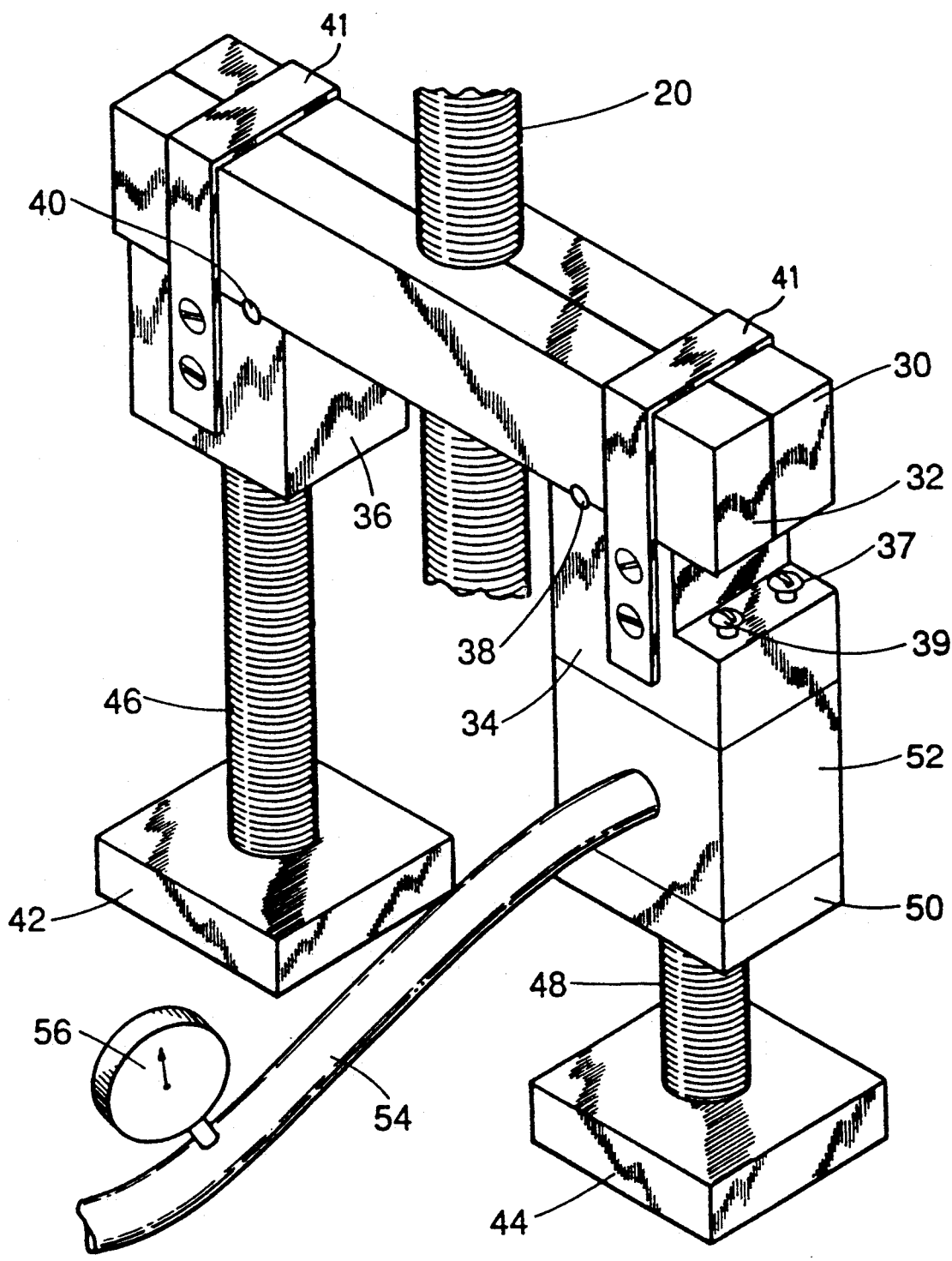
FIG. 2 is a perspective view showing a preferred embodiment of the present invention.

As shown in FIG. 2, the valve stem 20 is embraced by the two halves 30, 32 of the split loading beam which includes provision for gripping the valve stem, as will be discussed below.

The split loading beam is mounted to the blocks 34 and 36 by means of the pivots 38 and 40 respectively. Blocks 34 and 36 are additionally secured to the split beam halves by U-shaped securing straps 41.

The split loading beam extends through the space between the legs 16, 18 (not shown) of the yoke, and the blocks 42 and 44 rest on top of the body-to-bonnet flange 14 of the valve body 12. The threaded rod 46 provides a means for adjusting the axial position of the split beam along the valve stem 20. Similarly, the block 44, the threaded rod 48, and the block 50 provide a means of adjusting the other leg of the device.

In the preferred embodiment, a hydraulic actuator 52 is mounted between the block 50 and the block 34. As is well known in the art, application of pressurized hydraulic fluid to the ram 52 causes the piston of the ram (not visible in FIG. 2) to extend upward a fraction of a centimeter, pushing the block 34 away from the body 52 of the hydraulic ram. The screws 37, 39 serve to couple block 34 to the hydraulic ram 52 and to keep the hydraulic ram positioned directly under the block 34. The force exerted by the hydraulic ram is transmitted through the block 34 and the split loading beam to the valve stem. A pressure gauge 56 measures the hydraulic pressure, from which the magnitude of the force exerted by the hydraulic ram can be calculated.

In an alternative embodiment, air pressure can be used in place of pressurized hydraulic fluid to operate the actuator 52. In another embodiment, the hydraulic actuator 52 can be replaced entirely by a mechanical jack.

In another embodiment, the force exerted by the hydraulic actuator 52 is determined by inserting an instrumented strain button (not shown) in series between the hydraulic actuator 52 and the block 34.

In still another embodiment, the force exerted on the valve stem 20 can be measured by a longitudinally-mounted strain gauge (not shown) on the underside of either of the halves 30, 32 of the split loading beam.

Figure 3:
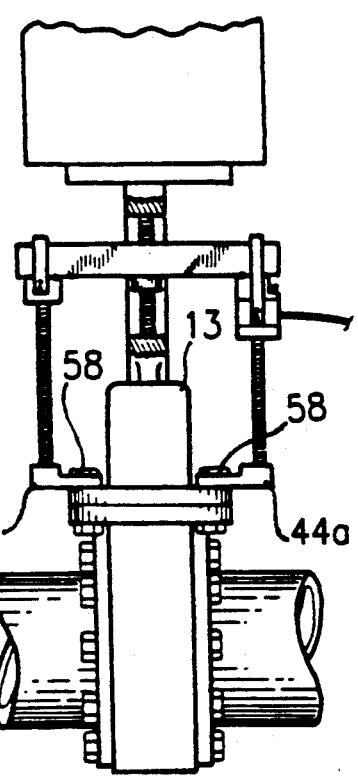
FIG. 3 is a side elevational view showing the preferred embodiment of FIG. 2 in use to apply a compressive load in an upward direction to the valve stem.
Figure 4:
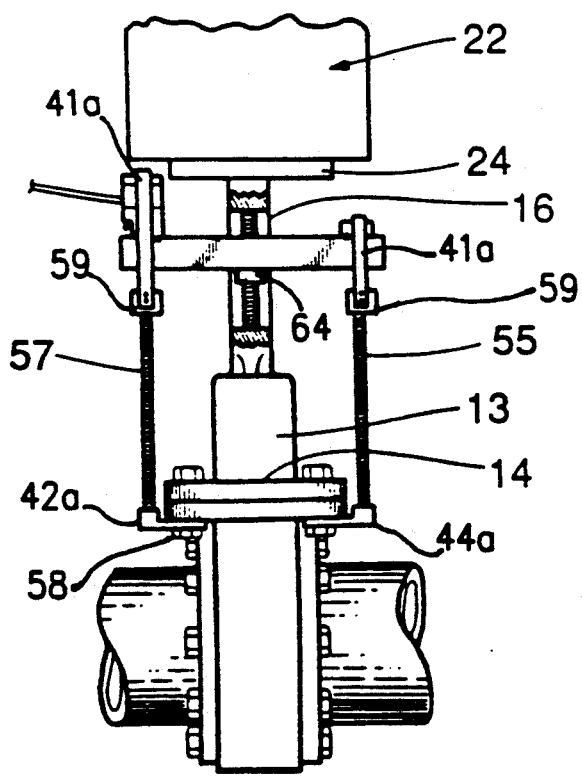
FIG. 4 is a side elevational view showing the preferred embodiment of FIG. 2 in use to apply a tensile load in a downward direction to the valve stem.

FIGS. 3 and 4 show the preferred embodiment of FIG. 2 in use. In FIG. 3, the blocks 42, 44 bear against the top of the body-to-bonnet flange 14 and the hydraulic actuator exerts an upward force on the valve stem. In FIG. 4, the apparatus is inverted for the purpose of applying a downward force on the valve stem. In this latter use, it is convenient to use the connecting supports 55, 57 for the hydraulic actuator to bear against.

Also in the embodiment shown in FIGS. 3 and 4, blocks 42a and 44a are modified so as to be securable to the valve flange 14. Holes (not shown) are provided in the blocks 42a, 44a so that the valve building bolt nuts 58 can secure the blocks to either the top (FIG. 3) or bottom (FIG. 4) of the flange 14. In this manner, the device of the present invention is prevented from moving relative to the valve during calibration. Also in FIG. 4, securing straps 41a mounting the blocks 34, 36 and ram 52 to the split beam halves 30, 32 are longer to reach to blocks 59 which are secured to legs 55 and 57.

Figure 5:
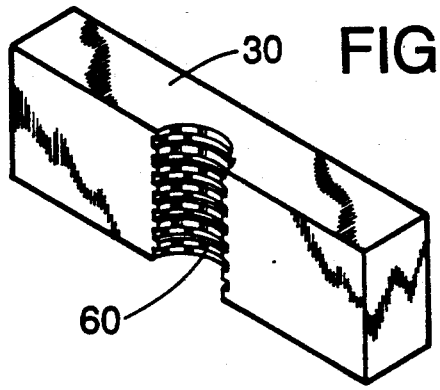
FIG. 5 is a perspective view showing half of the split loading beam used in a preferred embodiment of the present invention for use on a threaded valve stem.
Figure 6:
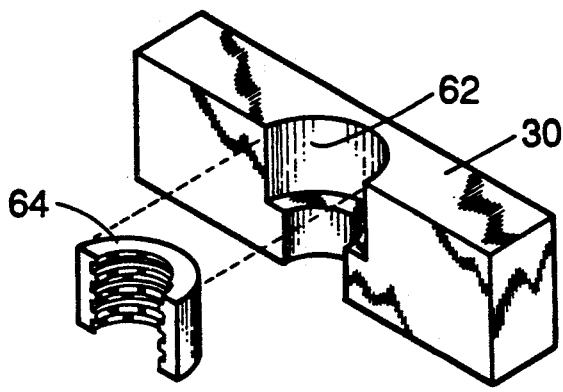
FIG. 6 is a perspective view showing half of the split loading beam used in an alternative embodiment of the present invention for use on a threaded valve stem.

FIGS. 5 and 6 show two different embodiments of one of the halves of the split loading beam for use in obtaining a grip on a threaded valve stem. In the embodiment of FIG. 5, the half 30 includes a threaded section 60. In the embodiment of FIG. 6, the half 30 includes a cavity 62 for holding half of a split nut 64.

Figure 7:
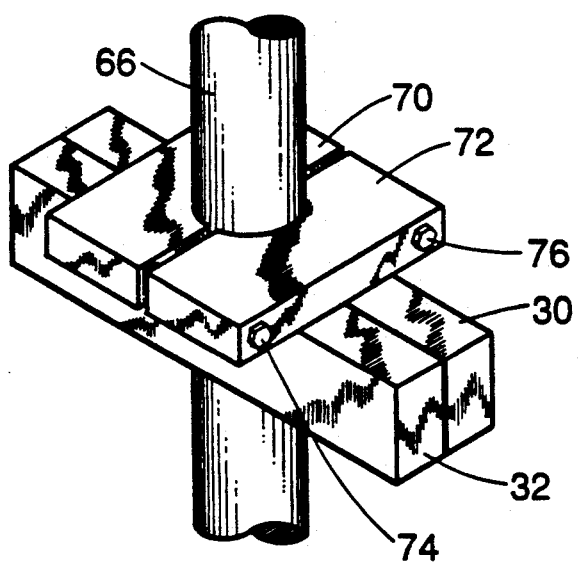
FIG. 7 is a perspective view showing parts of the present invention in an embodiment for use on an unthreaded valve stem; and, FIG. 8 is a side elevational view showing parts of the present invention in an alternative embodiment for use on an unthreaded valve stem.
Figure 8:
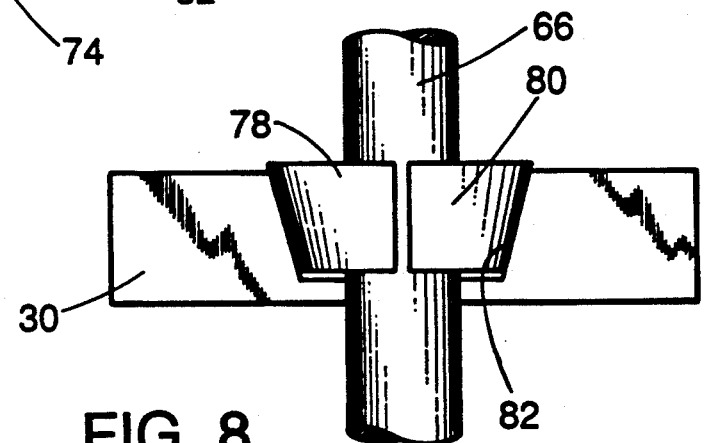

The embodiments shown in FIGS. 7 and 8 show ways of obtaining a grip on a smooth valve stem 66.

In the embodiment of FIG. 7, the blocks 70 and 72 are drawn together by the bolts 74 and 76 so that the blocks tightly grip the smooth valve stem 66. The split loading beam, which in this embodiment includes a clearance hole for the valve stem, is then brought up axially against the blocks 70, 72.

In the embodiment of FIG. 8, the smooth valve stem 66 is gripped by the wedges 78 and 80 that are contained in a tapered cavity 82 within the halves 30, 32 of the split loading beam.

Thus, there has been described an apparatus for applying an axial load to a valve stem whose ends are not accessible.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. Apparatus for applying an axial force to a valve stem, mounted in a valve yoke or the like, the ends of which are not accessible, comprising in combination:
    first and second loading beams juxtaposed on opposite sides of the valve stem and elongated in a direction perpendicular to the valve stem;
    means connecting said first and second loading beams and holding them together;
    a first leg pivotally connected to said first and second loading beams and extending approximately parallel to the valve stem;
    a second leg pivotally connected to said first and second loading beams and extending approximately parallel to the valve stem;
    first force means included in said first leg for exerting a force against said first and second loading beams.

2. The apparatus of claim 1 wherein said first force means is a hydraulic ram.

3. The apparatus of claim 1 wherein said first force means is a pneumatic ram.

4. The apparatus of claim 1 further comprising in combination: sensing means for determining the axial force applied to the valve stem.

5. The apparatus of claim 4 wherein said first force means is a pressure-actuated ram and wherein said sensing means further include a pressure gauge.

6. The apparatus of claim 1 further comprising in combination:
    grip means carried by said first and second loading beams for gripping the valve stem.

7. The apparatus of claim 6 wherein the valve stem is threaded and wherein said grip means include a split nut.

8. The apparatus of claim 6 wherein the valve stem is threaded and wherein said grip means include threads on said first and second loading beams.

9. The apparatus of claim 6 wherein the valve stem is not threaded and wherein said grip means include a pair of blocks on opposite sides of the valve stem and means for drawing said pair of blocks together, said pair of blocks resting on said first and second loading beams.

10. The apparatus of claim 6 wherein the valve stem is not threaded and wherein said grip means include:
    wedge-shaped cavities in said first and second loading beams; and,
    wedge-shaped blocks occupying said wedge-shaped cavities and jammed between said first and second loading beams and the valve stem.

* * * * *